United States Patent

[11] 3,629,612

[72] Inventor Donald Duane Harbert
Prosperity, Pa.

[21] Appl. No. 73,342
[22] Filed Sept. 18, 1970
[45] Patented Dec. 21, 1971
[73] Assignee RCA Corporation
New York, N.Y.

[54] OPERATION OF FIELD-EFFECT TRANSISTOR CIRCUIT HAVING SUBSTANTIAL DISTRIBUTED CAPACITANCE
11 Claims, 3 Drawing Figs.

[52] U.S. Cl. .......... 307/238,
307/246, 307/251, 307/304, 340/173 FF
[51] Int. Cl. .......... G11c 11/34
[50] Field of Search .......... 307/238,
246, 270, 205, 251, 304, 293; 340/173 FF

[56] References Cited

UNITED STATES PATENTS

| | | | |
|---|---|---|---|
| 3,343,130 | 9/1967 | Petschauer et al. .......... | 307/238 |
| 3,440,444 | 4/1969 | Rapp .......... | 307/238 |
| 3,535,699 | 10/1970 | Gaensslen et al. .......... | 340/173 |

*Primary Examiner*—Stanley D. Miller, Jr.
*Attorney*—H. Christoffersen

ABSTRACT: The distributed capacitance at circuit nodes between interconnected field-effect transistors of a memory decoder is maintained charged to a fixed value during the major portion of the memory operating time. For example, the distributed capacitance may be connected to the charging source except for brief intervals during which data is being written into or read from the memory. Operation in this way makes it possible to increase the memory operating speed.

INVENTOR.
Donald D. Harbert
BY
ATTORNEY

INVENTOR.
Donald D. Harbert
BY
[signature]
ATTORNEY

INVENTOR.
Donald D. Harbert
BY [signature]
ATTORNEY

OPERATION OF FIELD-EFFECT TRANSISTOR CIRCUIT HAVING SUBSTANTIAL DISTRIBUTED CAPACITANCE

SUMMARY OF THE INVENTION

A plurality of switches, such as field-effect transistors, all connected at one terminal to a circuit node exhibiting substantial distributed capacitance. An additional, normally closed switch connects the distributed capacitance to a charging voltage source for normally maintaining this capacitance charged. In response to a signal causing a flow of current through at least a number of said plurality of switches, the normally closed switch is opened.

DETAILED DESCRIPTION

Figure 1:
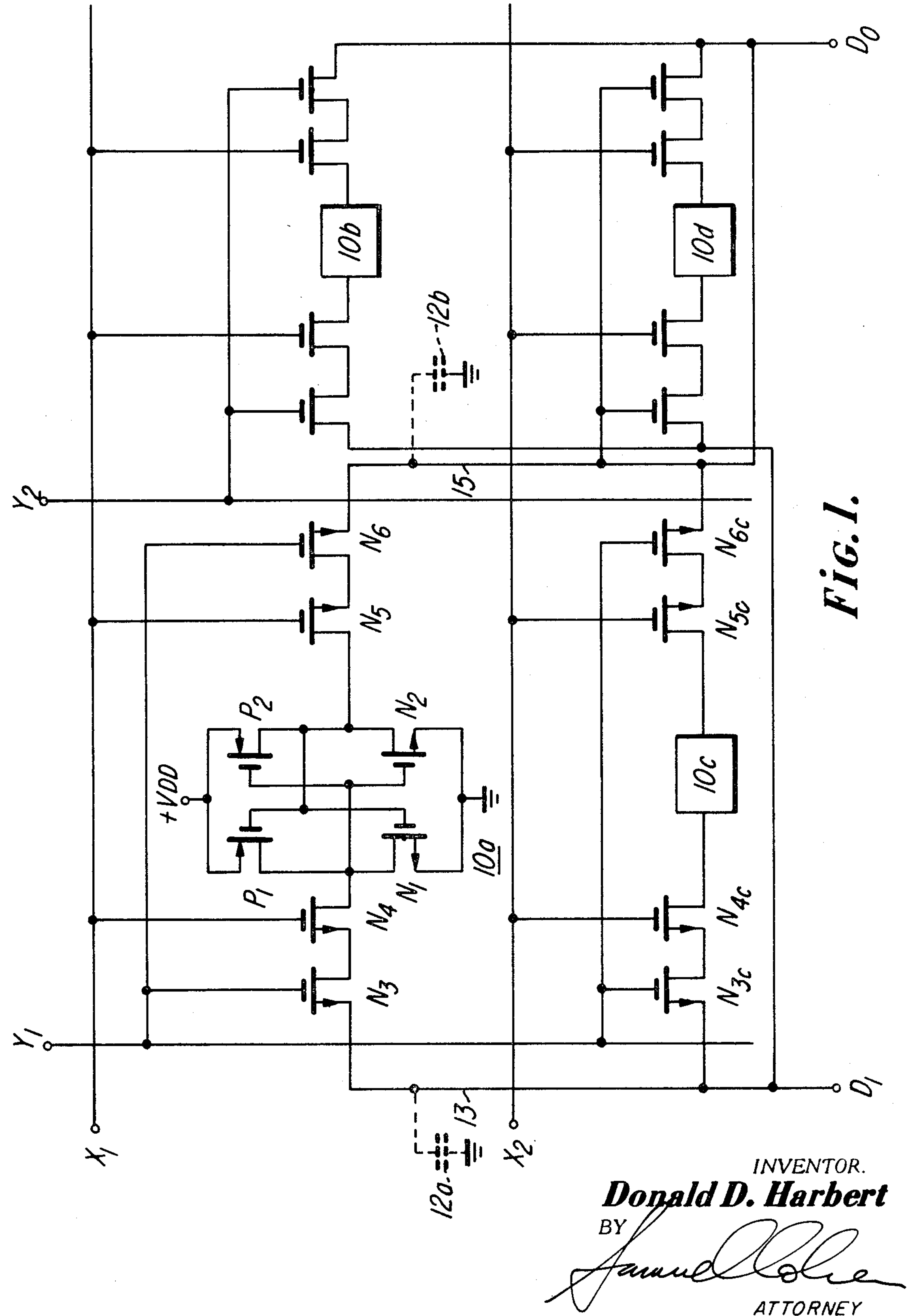
FIG. 1 is a block and schematic diagram of a portion of a field-effect transistor memory to illustrate the problem dealt with and solved in the present invention.
Figure 2:
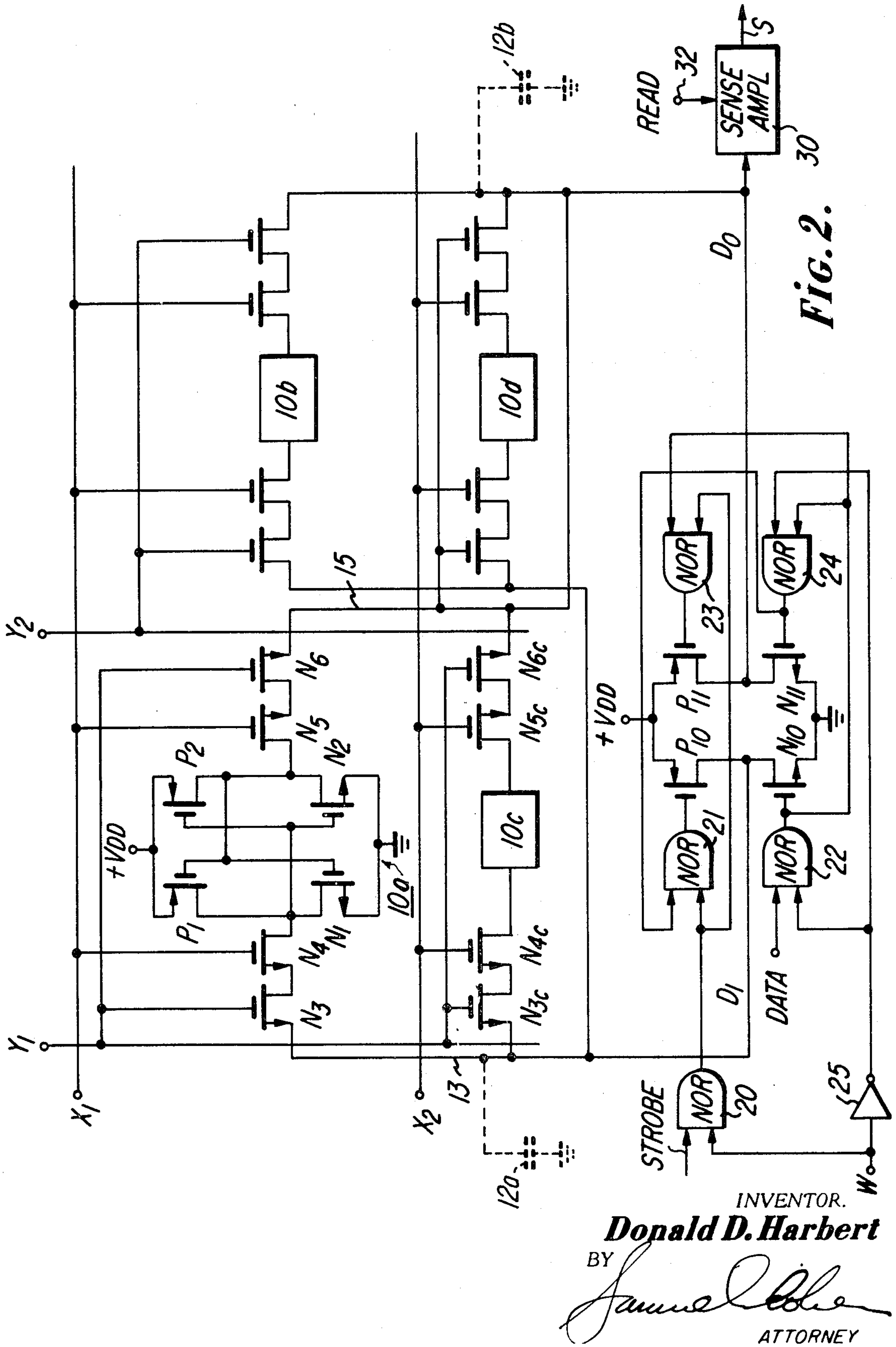
FIG. 2 is a block and schematic circuit diagram of a portion of the memory system embodying the present invention.

In the discussion which follows of FIGS. 1 and 2, a relatively positive voltage level arbitrarily is assumed to represent the binary digit (bit) 1 and a relatively low voltage level such as ground is assumed to represent the bit 0. In all figures the characters P and N used to identify transistors also indicate their conductivity types.

The memory shown in FIG. 1, which may be an integrated circuit memory, includes eight field-effect transistors of the metal oxide semiconductor (MOS) type per memory location. While only 2×2 locations are shown, in practice the memory may have 4×4 or 8×8 or a much larger number of such locations and the array need not have the same number of rows as columns. The information 1 or 0 is stored at each location in a complementary symmetry (CMOS), four-transistor flip-flop such as 10*a*. It is shown schematically and the remaining flip-flops 10*b*–*10d* are shown in block form. The gate electrodes of transistors $P_1$ and $N_1$ are connected to the common drain connection of transistors $P_2$ and $N_2$ and the gate electrodes of transistors $P_2$ and $N_2$ are connected to the common drain connection of transistors $P_1$ and $N_1$. The source electrodes of transistors $P_1$ and $P_2$ are connected to a voltage source $+V_{DD}$ having a value such as +10 volts. The source electrodes of transistors $N_1$ and $N_2$ are connected to a second voltage source such as ground.

The four remaining transistors such as $N_3$, $N_4$, $N_5$ and $N_6$ at each location are decoder transistors. The conduction paths of transistors $N_3$ and $N_4$ are connected in series between digit line $D_1$ and the common gate connection of transistors $P_2$ and $N_2$. The conduction paths of transistors $N_5$ and $N_6$ are connected in series between the digit line $D_0$ and the common gate connection of transistors $P_1$ and $N_1$. The gate electrodes of transistors $N_3$ and $N_6$ are connected to the $Y_1$ line; the gate electrodes of transistors $N_4$ and $N_5$ are connected to the $X_1$ line.

In the operation of the memory of FIG. 1, all of the X and Y lines quiescently are at ground and the $D_1$ and $D_0$ lines are connected to external circuits (not shown). The latter apply various voltage levels to the lines, as discussed below, in the write mode of operation, and sense the information stored in the selected memory during the read mode of operation. To write a 1 into a memory location such as 10*a*, line $D_1$ is placed at a relatively positive voltage level such as $+V_{DD}$, $D_0$ is placed at a relatively low voltage level such as ground, the row lead $X_1$ is placed at a relatively positive voltage level such as $V_{DD}$ and column lead $Y_1$ is also placed at the same relatively positive voltage level. The relatively positive $X_1$ and $Y_1$ voltages applied to the gate electrodes of decoder transistors $N_3$, $N_4$, $N_5$, and $N_6$ place the conduction paths of these transistors in their relatively low impedance state. Accordingly, the ground level at $D_0$ is applied through the conduction paths of transistors $N_6$ and $N_5$ to the gate electrodes of transistors $N_1$ and $P_1$ turning transistor $P_1$ on and transistor $N_1$ off. In similar fashion, the $+V_{DD}$ level at $D_1$ applied via transistors $N_3$ and $N_4$ to the gate electrodes of transistors $P_2$ and $N_2$ turns transistor $P_2$ off and $N_2$ on. This is the "one" state of flip-flop 10*a* ($P_1$ and $N_2$ on, and $P_2$ and $N_2$ off).

To write a 0 into a memory location such as 10*a*, again $X_1$ and $Y_1$ are both raised to a high voltage level such as $+V_{DD}$ but now $D_0$ is made to represent a 1 ($+V_{DD}$) and $D_1$ is made to represent a 0 (ground). In response to these conditions, transistors $P_2$ and $N_1$ are turned on and transistors $P_1$ and $N_2$ are turned off. This is the zero state of the flip-flop.

While the memory above is operative, it has been found that as the memory size and speed increase, the memory operation becomes less and less satisfactory. The reason, it has been found, is distributed capacitance. With the memory connected as shown in FIG. 1, because of the many $N_3$ transistors (only two are shown, but in a larger memory there will be many more) connected to a relatively long common line 13 (the $D_1$ line) on a common memory substrate and similarly the many $N_6$ transistors connected to a relatively long common line 15 (the $D_0$ line) on the common substrate, a substantial amount of distributed capacitance exists at each such line. This capacitance is shown in phantom view at 12*a* and 12*b*. This distributed capacitance adversely affects the decoder circuit operation in the following ways.

Assume that a 1 has been written into memory location 10*a*. During the write-in time, line $D_0$ is maintained at ground. Accordingly, distributed capacitance 12*b* becomes substantially fully discharged. When the decoder lines $X_1$ and $Y_1$ are returned to ground potential and the $D_1$ and $D_0$ lines are disconnected from all of the memory locations, this distributed capacitance 12*b* remains discharged. This uncharged distributed capacitance tends to slow down the memory operation.

Assume, for example, that after the operation above, it is desired to write a 0 into location 10*c*. $Y_1$ and $X_2$ are placed at $+V_{DD}$, line $D_0$ is driven by write logic circuits (not shown) toward $+V_{DD}$ and line $D_1$ is driven toward ground. However, if line 15 "sees" connected thereto the large value of distributed capacitance 12*b*, which is uncharged, line 15 cannot go high instantaneously but instead follows the charging exponential for capacitor 12*b*. Depending upon the geometry and size of the memory, the time required for line 15 to reach the potential necessary to write the information desired into the memory location may be from several tens to several hundreds of nanoseconds and this, of course, must be added to the read-write memory cycle time.

The uncharged node capacitances also adversely affect the read operation. Assume that a 1 has just been written into location 10*c* ($D_1$=$+V_{DD}$, $D_0$=$O$) so that distributed capacitance 12*b* is discharged and distributed capacitance 12*a* is charged to $+V_{DD}$. Now it is desired to read the information stored at some previous time at 10*a* and this information is a O ($N_1$ on, $P_1$ off; $N_2$ off, $P_2$ on). During a read operation, both $D_1$ and $D_2$ are effectively disconnected from the write circuits (not shown) and a sense amplifier (not shown) connected, for example, to the $D_0$ line senses any flow of current through this line.

To select 10*a* for a read operation, $X_1$ and $Y_1$ are raised to $+V_{DD}$. As $P_2$ of 10*a* is on, one would expect current to flow from the $+V_{DD}$ terminal through transistors $P_2$, $N_5$ and $N_6$ to line $D_0$ to the sense amplifier (not shown). However, in the circumstances given, capacitor 12*b* is discharged so that, momentarily a substantial portion of the current flowing out of transistor $N_6$ flows into capacitor 12*b* rather than into the sense amplifier. It is only after an interval such as mentioned above, which may be upwards of several tens of nanoseconds, that the capacitor 12*b* charges sufficiently that the current at a line such as $D_0$ increases to a value which exceeds the threshold level of the sense amplifier. Thus, the read operation must be slowed down sufficiently to take into account the distributed capacitance present in the circuit.

An even more serious problem arises due to the distributed capacity when nondestructive readout of the information stored in the memory is required. Assume, for example, that memory cell **10*a* shown in FIG. 2 is storing a 1 and memory cell 10*c* is storing a 0. Also assume that during the read operation that the order of reading is first memory cell 10*c*, then memory cell 10*a*. After memory cell 10*c* has been read, capacitor 12*a* is at ground potential and capacitor 12*b* is at $+V_{DD}$. At the moment of time that memory cell 10*a* is selected by placing transistors $N_3$, $N_4$, $N_5$ and $N_6$ in a conducting condition, the common gate connection of $P_2$ and $N_2$ is momentarily grounded through $N_3$, $N_4$ and capacitor 12*a***. This may cause the memory flip-flop $P_1$, $P_2$, $N_1$, $N_2$ to change state thereby destroying the information previously stored.

A solution according to the present invention to the problems discussed above is shown in FIG. 2. The memory itself is similar to that already discussed. In addition, there is a plurality of logic gates for the read-write operation and four transistors $P_{10}$, $P_{11}$, $N_{10}$, and $N_{11}$. Transistors $P_{10}$ and $P_{11}$ are connected at their source to $+V_{DD}$ and transistors $N_{10}$ and $N_{11}$ are connected at their sources to ground. The drain of transistor $P_{10}$ is connected to the drain of transistor $N_{10}$ and the drain of transistor $P_{11}$ is connected to the drain of transistor $N_{11}$.

The logic gates 20–24 are all NOR gates. NOR-gate 21 is connected at its output to the gate electrode of transistor $P_{10}$. NOR-gate 22 is connected to its output to the gate electrode of transistor $N_{10}$ and to one input to NOR-gate 24. NOR-gate 23 is connected at its output to the gate electrode of transistor $P_{11}$. NOR-gate 24 is connected at its output to the gate electrode of transistor $N_{11}$ and to one input to NOR-gate 21. NOR-gate 20 is connected to receive a strobe signal and a write signal W and is connected at its output to NOR-gates 21 and 23. The write signal is also applied via inverter 25 to NOR-gate 22 and 24.

The operation of the circuit of FIG. 2 is described in the table below:

| W | Strobe | Data | 20 | 21 | 22 | 23 | 24 | $D_1$ | $D_0$ | Remarks |
|---|---|---|---|---|---|---|---|---|---|---|
| 0 | 0 | $\phi$ | On | Off | Off | Off | Off | 1 | 1 | Quiescent state. |
| 1 | $\phi$ | 1 | Off | Off | Off | On | On | 1 | 0 | Write 1. |
| 1 | $\phi$ | 0 | Off | On | On | Off | Off | 0 | 1 | Write 0. |
| 0 | 1 | $\phi$ | Off | On | Off | On | Off | * | * | Read. |

Where:

1 = $+V_{DD}$
0 = Ground
Φ = Don't Care
* = Depends on bit stored
On = Gate producing a 1 ($+V_{DD}$)
Off = Gate producing 0 (Ground)

While the table above is believed to be reasonably self-explanatory, a number of rows in the table are discussed briefly here. During the quiescent state, *W*=0 and strobe=0 and it does not matter whether or not data is present.

In response to two zeros, NOR-gate 20 produces a 1 output and this disables NOR-gate 21 and 23. The disabled NOR gates apply a 0 (ground) to the gate electrodes of transistors $P_{10}$ and $P_{11}$ and these transistors conduct. Therefore, lines $D_1$ and $D_0$ are at a voltage of approximately $+V_{DD}$ volts. This voltage maintains the distributed capacitances **12*a* and 12*b*** charged to a voltage approximately equal to $+V_{DD}$.

The 1 produced by inverter 25 disables NOR-gate 22 and 24. These gates therefore apply a 0 (ground) to the gate electrodes of transistors $N_{10}$ and $N_{11}$ placing their conduction paths in a high impedance condition. Accordingly, lines $D_1$ and $D_0$ are disconnected from ground.

The write operation is set forth in lines 2 and 3 of the table. In order to write, W is made equal to 1, and data is made equal to the bit it is desired to write into a particular memory location. It does not matter if the strobe input is present or not because NOR-gate 20 is disabled by the 1 present at the *W* input. For example, if it is desired to write a 1 into memory location **10*a*, $X_1$ and $Y_1$ are both placed at $+V_{DD}$. The decoder transistors $N_3$, $N_4$, $N_5$ and $N_6$ are turned on in response to these voltages. Accordingly, memory location 10*a*** is selected.

In response to the data=1 signal, NOR-gate 22 is turned off placing the conduction path of transistor $N_{10}$ in its high impedance condition. In response to the write=1 signal, inverter 25 applies a 0 to an input to NOR-gate 24 and the second input to NOR-gate 24 is at 0 by virtue of the disabled gate 22. Accordingly, NOR-gate 24 produces a 1 ($+V_{DD}$), placing the conduction path of transistor $N_{11}$ in its low impedance condition. Therefore, line $D_0$ is placed at ground. At the same time two zeros are applied to NOR-gate 23 enabling the same and this enabled gate turns off transistor $P_{11}$. This effectively disconnects the charging voltage source $+V_{DD}$ from the $D_0$ line.

The 1 produced by NOR-gate 24 disables NOR-gate 21 and this disabled NOR gate turns on transistor $P_{10}$. Accordingly, the voltage $+V_{DD}$ is applied through the conduction path of transistor $P_{10}$ to line $D_1$.

The ground level present at line $D_0$ is applied via transistors $N_5$ and $N_6$ to the gate electrodes of transistors $P_1$ and $N_1$ turning transistor $P_1$ on and transistor $N_1$ off. The $+V_{DD}$ voltage at line $D_1$ is applied via transistors $N_3$ and $N_4$ to the gate electrodes of transistors $P_2$ and $N_2$ turning transistor $P_2$ off and transistor $N_2$ on. As distributed capacitance **12*a* is essentially fully charged immediately prior to the write interval, no delay is experienced between the time $+V_{DD}$ is applied via transistor $P_{10}$ to line $D_1$ and the time this voltage is available to the selected memory location 10*a* for writing into that location. Moreover, the charging voltage source automatically is disconnected from the other distributed capacitance 12*b***.

The third line of the table is believed to be self-explanatory in view of the explanation above. Here line $D_1$ goes low (ground) and line $D_0$ goes high ($+V_{DD}$) in order to write a 0 into whichever memory location is selected. The charging voltage source $+V_{DD}$ automatically is disconnected from line $D_1$ by the turned off transistor $P_{10}$.

The last line of the table illustrates the read operation: *W*=0, strobe=1 and it does not matter whether or not a data signal is present. As shown in the table, in response to these two signals NOR-gates 22 and 24 are disabled and they turn off transistors $N_{10}$ and $N_{11}$. NOR-gates 21 and 23 are enabled by the two lows at their inputs and they turn off P-type transistors $P_{10}$ and $P_{11}$. Accordingly, the digit lines $D_1$ and $D_0$ are disconnected from both ground and $+V_{DD}$ at these four transistors.

To read information from a memory location, the X and Y voltages for that location are raised in potential to $+V_{DD}$. If at the selected memory location the bit 1 is being stored ($P_1$ and $N_2$ on, and $P_2$ and $N_1$ off) current flows from the $+V_{DD}$ terminal through transistor $P_1$ and through the selected decoder transistors (such as $N_3$ and $N_4$) to the $D_1$ line whereas the $D_0$ line is connected via transistors such as $N_5$ and $N_6$ and memory location transistor $N_2$ to ground so that no current flows at $D_0$. On the other hand, if an accessed memory location is storing a 0, current will flow via the conducting transistor $P_2$ of the selected memory location to line $D_0$ and $D_1$ will be connected via the conducting transistor $N_1$ of a memory location to ground.

Figure 3:
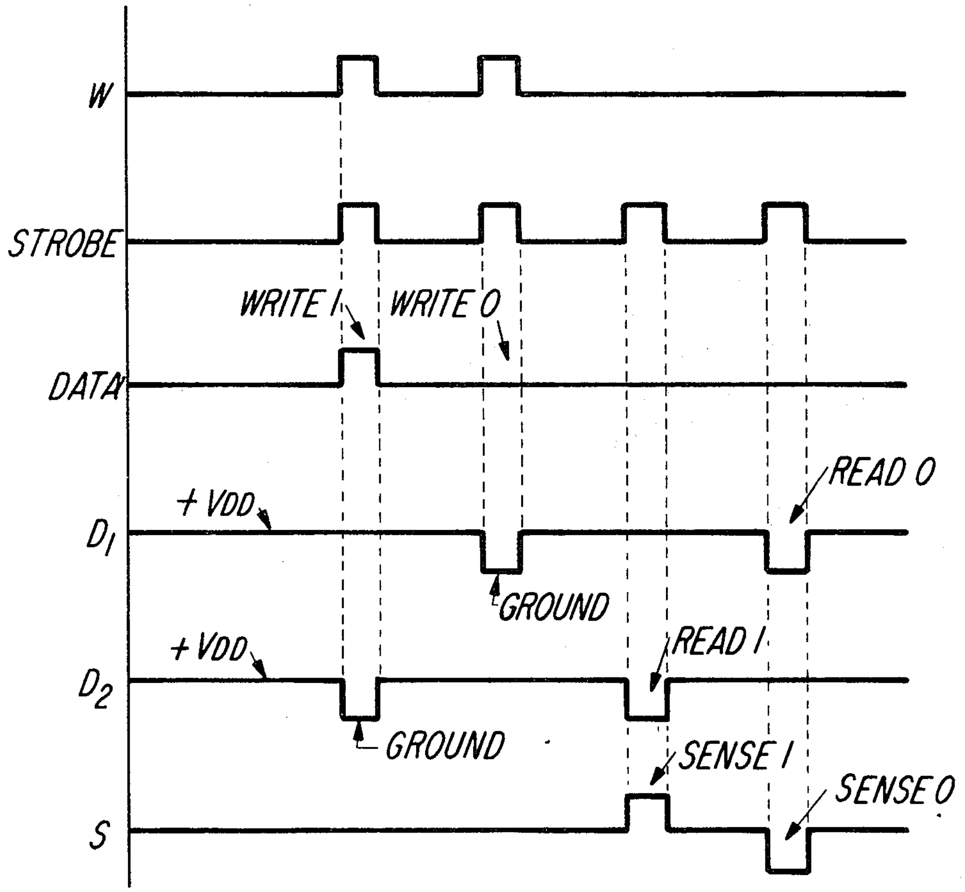
FIG. 3 is a drawing of waveforms present in the circuit of FIG. 2.

A sense amplifier such as illustrated at 30 in FIG. 2 may be connected to one of the digit lines for sensing whether or not current flows there. The sense amplifier normally may be in the off state and may be placed in the sensing condition by a read strobe pulse applied to terminal 32 during the read interval. The sense amplifier may be of the bidirectional type in which case the sense voltage S may be shown in FIG. 3. FIG. 3 also shows other waveforms present during the circuit operation.

Summarizing the discussion above, in the read mode of operation, during the interval between read commands the distributed capacity at $D_1$ and $D_0$ is charged to $+V_{DD}$ through a conducting P-type MOS device. There is no direct conduction path to ground and the only energy expended is that required to charge the distributed capacity to $+V_{DD}$. During a read command interval, while one of the memory cells is selected by its decoder transistors, the $D_1$ and $D_0$ lines are effectively disconnected from both $+V_{DD}$ and ground and the voltages present on these lines are determined by the status of the selected memory cell. The time required for the voltage on the lines to reach a value which can be sensed with a sense amplifier is dependent on the magnitude of the stray capacity at lines $D_1$ and $D_0$ and the resistance between the data line and ground. This is the resistance through two decoder transistors and one of the N-type resistors in the memory cell.

During the write mode of operation, the precharging circuit is disabled and the remainder of the circuit is used to control the level at the $D_1$ and $D_0$ lines dependent upon the data being written into the memory. An important advantage of the circuit during the write mode is that there is no direct conduction path between $+V_{DD}$ and ground; therefore, the only energy expended is that required to charge and discharge the distributed capacity present at the $D_1$ and $D_0$ lines and to change the state of the memory cell (if the data written is different than that previously stored). The time required to charge either line $D_1$ or $D_0$ from ground to approximately $+V_{DD}$ is dependent on the magnitude of the distributed capacity on the data line (on $D_1$ or $D_0$) and the "on" resistance of one of the P devices such as $P_{10}$ in FIG. 2. For this reason it is advantageous to make the transistors such as $P_{10}$ and $P_{11}$ as large as possible in order to reduce the resistance of the conduction path when the transistor is in its conducting state.

Some of the important advantages of the circuit of the present application are:

1. There is no direct conduction path to ground in either the read or write mode. For this reason, the power consumed is only that required to charge and discharge the distributed capacity on the data lines and to change the state of the memory cell, if required.

2. The same circuit can be used for reading and writing with only one control signal (W) required.

3. The read-write circuit contains only P- and N-type MOS devices and may be fabricated on the same chip as the memory.

4. The problem of uncharged capacity on the data lines, which could cause the memory to change state during the mode of operation, is overcome.

What is claimed is:

1. A circuit for improving the operation of a circuit which includes a plurality of field-effect transistors, each having a conduction path and a control electrode for controlling the conductivity of its path, and in which a plurality of said conduction paths are connected to one another at a circuit node which exhibits substantial distributed capacitance, comprising, in combination;

a precharging field-effect transistor having a conduction path connected between said circuit node and a source at a given potential, and having a control electrode for controlling the conductivity of said path;

means for normally maintaining said control electrode of said precharging transistor at a value to place the conduction path of said precharging transistor in a relatively low impedance condition, whereby said source places said circuit node at said given potential; and means responsive to a signal manifestation in response to which current flows through a pair of said conduction paths of said plurality of field-effect transistors for placing said precharging transistor in a high impedance condition.

2. A circuit as set forth in claim 1 wherein said precharging transistor is of one conductivity type and said plurality of transistors are of opposite conductivity type.

3. In combination;

first and second switches, the first connected between a circuit point and a voltage source of one value and the second connected between said circuit point and a voltage source of different value, one of said switches being open and the other being closed;

third and fourth normally open switches connected in series between a circuit node and said circuit point, said circuit node exhibiting substantial distributed capacitance to said voltage source of different value;

a fifth normally closed switch connected between a source of voltage of a value closer to said one value than to said different value and said circuit node for normally maintaining said node at said value closer to said one value; and means responsive to a control signal for opening said fifth switch when both said third and fourth switches are closed.

4. In the combination as set forth in claim 3, said switches comprising field-effect transistors.

5. In the combination as set forth in claim 3, said second, third and fourth switches comprising field-effect transistors of one conductivity type and said first and fifth switches comprising field-effect transistors of opposite conductivity type.

6. In combination;

a circuit point;

means effectively connecting said circuit point to one of two voltage sources, the first such source having one value and the second such source having a second value;

first and second normally open switches connected in series between a circuit node and said circuit point, said node exhibiting substantial distributed capacitance relative to said voltage source of second value;

a third normally closed switch connected between a source of voltage of a value closer to said one value than to said second value and said node for normally maintaining said distributed capacitance charged; and means for closing said first and second switches; and means responsive to a strobe signal which occurs concurrently with the closing of said first and second switches for opening said third switch.

7. In combination;

first and second normally open switches connected in series between a circuit node and a circuit point which connects to one of (a) ground and (b) a voltage source of value other than ground, said circuit node exhibiting substantial distributed capacitance to ground, whereby when said circuit point is at ground and said switches are first both closed and then both opened, said distributed capacitance, if charged, first discharges and then tends to remain discharged;

a third normally closed switch connected between a source of voltage of a value closer to that of said voltage source than to ground and said circuit node for normally maintaining said distributed capacitance charged;

means for closing said first and second switches; and means responsive to a signal for opening said third switch when current flows through said first and second switches.

8. In combination;

a field-effect transistor memory circuit which at a given terminal thereof is at one voltage level when it stores a 1 and at a second voltage level when it stores a 0;

two field-effect transistors, each having a conduction path and a gate electrode for controlling the conductivity of said path;

a digit line connected to said terminal via the series connected conduction paths of said two transistors, said digit line exhibiting substantial distributed capacitance;

charging means connected to said digit line for normally maintaining said distributed capacitance charged to a level in the approximate range of one of said voltage levels; and means for disconnecting said charging means from said distributed capacitance when said digit line is placed at a voltage level in the approximate range of the other of said voltage levels.

9. In a field-effect transistor memory array, in combination;

a plurality of field-effect transistor storage cells;

a plurality of circuit nodes, each coupled to a plurality of said storage cells and each node exhibiting distributed capacitance;

charging means connected to said nodes for normally maintaining said capacitances charged to a reference value;

cell selection means for selecting a desired one of said cells comprising means for applying a select signal manifestation to said desired cell; and means responsive to said cell selection means for disconnecting said charging means from at least a node connected to a selected cell.

10. In a field-effect transistor memory array as set forth in claim 9, said memory array comprising an integrated circuit memory on a common substrate, said circuit nodes exhibiting distributed capacitance to said substrate, said charging means including a voltage source, switch means connecting one terminal of said source to said circuit nodes, and a connection from the other terminal of said source to said substrate, and said last-named means comprising means for opening said switch means.

11. A network in which there are included:

at least one circuit having a terminal which is internally connected either to a point at a first voltage or to a point at a second voltage;

a node which is external to the circuit and which is capacitively coupled to said point at said first voltage;

means including selection switch means selectively operable for closing and opening a connection between said terminal and said node;

a circuit connected to said node for one of applying a signal to and receiving a signal from said terminal when said selection switch means has closed said connection between said terminal and said node;

means comprising an additional switch for applying to said node, when such additional switch is closed, a given value of voltage; and control means for opening said additional switch when said selection switch means has closed said connection between said terminal and said node and for closing said additional switch when said selection switch means has opened said connection between said terminal and said node.

* * * * *

Disclaimer 3,629,612.—*Donald Daune Harbert*, Prosperity, Pa. OPERATION OF FIELD-EFFECT TRANSISTOR CIRCUIT HAVING SUBSTANTIAL DISTRIBUTED CAPACITANCE. Patent dated Dec. 21, 1971. Disclaimer filed Aug. 27, 1973, by the assignee, *RCA Corporation.*

Hereby enters this disclaimer to claims 1 and 2 of said patent.

[*Official Gazette April 23, 1974.*]